US006907264B1

(12) United States Patent  
Sterkel

(10) Patent No.: US 6,907,264 B1  
(45) Date of Patent: Jun. 14, 2005

(54) METHODS AND APPARATUS FOR MODULARIZATION OF REAL TIME AND TASK ORIENTED FEATURES IN WIRELESS COMMUNICATIONS

(75) Inventor: Terrence Eugene Sterkel, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 675 days.

(21) Appl. No.: 09/634,356

(22) Filed: Aug. 9, 2000

(51) Int. Cl.[7] ............................................... H04Q 7/20
(52) U.S. Cl. ............................... 455/556.1; 455/556.2; 455/558; 455/551
(58) Field of Search .......................... 455/556.1, 551, 455/556.2, 128, 348, 349, 550, 556, 557, 558, 566, 575; 370/376

(56) References Cited

U.S. PATENT DOCUMENTS

| | | | | |
|---|---|---|---|---|
| 5,579,489 A | * | 11/1996 | Dornier et al. | ............. 710/303 |
| 6,122,526 A | * | 9/2000 | Parulski et al. | ............. 455/556 |
| 6,177,950 B1 | * | 1/2001 | Robb | ....................... 348/14.01 |
| 6,192,255 B1 | * | 2/2001 | Lewis et al. | ................ 455/558 |
| 6,219,560 B1 | * | 4/2001 | Erkkila et al. | ............... 455/557 |
| 6,477,357 B1 | * | 11/2002 | Cook | ........................... 455/90 |
| 6,490,464 B1 | * | 12/2002 | Oda | ............................ 455/558 |
| 6,625,445 B1 | * | 9/2003 | Ishigami | ..................... 455/419 |
| 2001/0027121 A1 | * | 10/2001 | Boesen | ........................ 455/556 |
| 2002/0021696 A1 | * | 2/2002 | Minborg | ..................... 370/392 |

FOREIGN PATENT DOCUMENTS

GB         2251357 A  *  7/1992  .......... H04M/1/274

* cited by examiner

*Primary Examiner*—Jean Gelin

(57) ABSTRACT

A wireless telephone comprising a basic telephone module adapted to perform time critical functions, and an enhanced services module adapted to perform non time critical functions is disclosed. The basic telephone module includes processing resources needed to provide communication, while the enhanced services module performs enhanced functions which can be performed on a non time critical basis so that processing resources belonging to the basic telephone module do not need to be diverted to these functions but instead can be dedicated to performing time critical functions. The basic telephone module can be removed from the enhanced services module and connected to a different enhanced services module, similarly, the enhanced services module can be removed from the basic telephone module and connected to a different basic telephone module. This feature allows a user to retain his or her basic telephone module or enhanced services module when acquiring a new or upgraded enhanced services module or basic telephone module.

23 Claims, 5 Drawing Sheets

METHODS AND APPARATUS FOR MODULARIZATION OF REAL TIME AND TASK ORIENTED FEATURES IN WIRELESS COMMUNICATIONS

FIELD OF THE INVENTION

The present invention relates generally to improvements in wireless telephony. More particularly, the invention relates to the use of multiple, optimized processors for communication and peripheral functions in wireless communication.

BACKGROUND OF THE INVENTION

Wireless telephones have grown more and more prevalent in recent years. As wireless telephones have increased in importance, they have also become more integrated into the daily lives of the users. More and more elaborate wireless telephones have become available, performing more and more functions. Wireless telephones have traditionally included enhanced features such as programmable ring tones, speed dial and similar features, and there is now a desire on the part of developers and consumers to include functions such as personal digital assistant (PDA) features, web browsing features and numerous other functions and features to wireless telephones.

The more features a wireless telephone includes, the more processing power it requires. Because consumers have shown a strong desire for a wireless telephone to be small and lightweight, space for processing hardware has always been at a premium. Therefore, addition of features can be difficult to achieve if the addition of features increases the processing power required and results in a concomitant increase in size or reduction in battery life.

Moreover, as wireless telephones become more and more integrated into the lives of the users, users become more attached to the particular features possessed by their personal wireless telephones. A user may spend time choosing and setting features of a wireless telephone and may appreciate an opportunity to retain those features when replacing or upgrading the telephone. Moreover, because of the demands which features place on the available processing power, it may be desirable to choose only desired features, rather than the entire set of features which may be available.

Certain features of wireless telephones, such as data transfer and processing for communication, must execute in real time and require immediate attention from the processing resources of the telephone. It may be desired to add additional features to a telephone in order to provide greater utility. Such additional features may include scheduling and calendar features such as may be found in a personal digital assistant, speed dialing, web browsing and the like. Timing is typically not critical to the accomplishment of such functions. For example, a personal digital assistant operation such as looking up an address is done on a time scale characteristic of human activities. The entry of the address lookup index may occur over a period of several seconds, and if the display of the address occurs within a second after entry of the index, a human being is not likely to notice any delay. Such processes can therefore be given a lower priority than the communication functions of a telephone, and can be fitted into available time windows not occupied by communication functions. If enhanced features such as personal digital assistant operations and the like are performed using the same hardware that is used in providing communication processing for the telephone, it is necessary to enhance the processing hardware, often at considerable expense, or else risk an unacceptable degradation of the communication functions. It is therefore highly desirable to accomplish enhanced functions in a way that does not tend to occupy processor resources which are better devoted to the central communication functions of the telephone.

Moreover, certain functions related to communication, such as registration and authentication, are accomplished during initial power up of the telephone or at the beginning of a call, and before any critical communication processing is occurring. It is therefore possible to accomplish these functions in a way which does not involve components better reserved for critical communication processing.

There exists, therefore, a need in the art for a wireless telephone which is capable of performing enhanced functions without diverting computational resources needed by communication functions, which allows for portability of enhanced functions and which allows for selection of which enhanced functions are to be operational in the telephone.

SUMMARY OF THE INVENTION

A wireless telephone according to the present invention has two separate modules, each preferably comprising a processor and an accompanying chipset adapted for use with and support of that processor. The first module is a basic telephone module optimized for performing time critical processes needed for operation of a wireless telephone, and provides functionality comprising basic telephone functions with a minimum of enhanced features. The second module is an enhanced services module optimized for performing non time critical processes which add features or functions to the telephone, such as programmable rings, speed dial, PDA functions and the like. The great majority of non time critical functions are managed by the enhanced services module, without a need for the basic telephone module to divert processing resources away from time critical processes. The enhanced services module transfers data among supporting components on a bus preferably designed using standard PC architecture. The basic telephone module and the enhanced services module exchange instructions and data through an interface module. The interface module, basic telephone module and enhanced services module preferably include zero-insertion-force (ZIF) connectors so that a basic telephone module or an enhanced services module may be connected or removed, allowing connection of a basic telephone module to different enhanced services modules, or connection of an enhanced services module to different basic telephone modules. This allows a user to retain an enhanced services module while using the enhanced services module with a different or upgraded basic telephone module.

A more complete understanding of the present invention, as well as further features and advantages of the invention, will be apparent from the following Detailed Description and the accompanying drawings.

DETAILED DESCRIPTION

Figure 1:
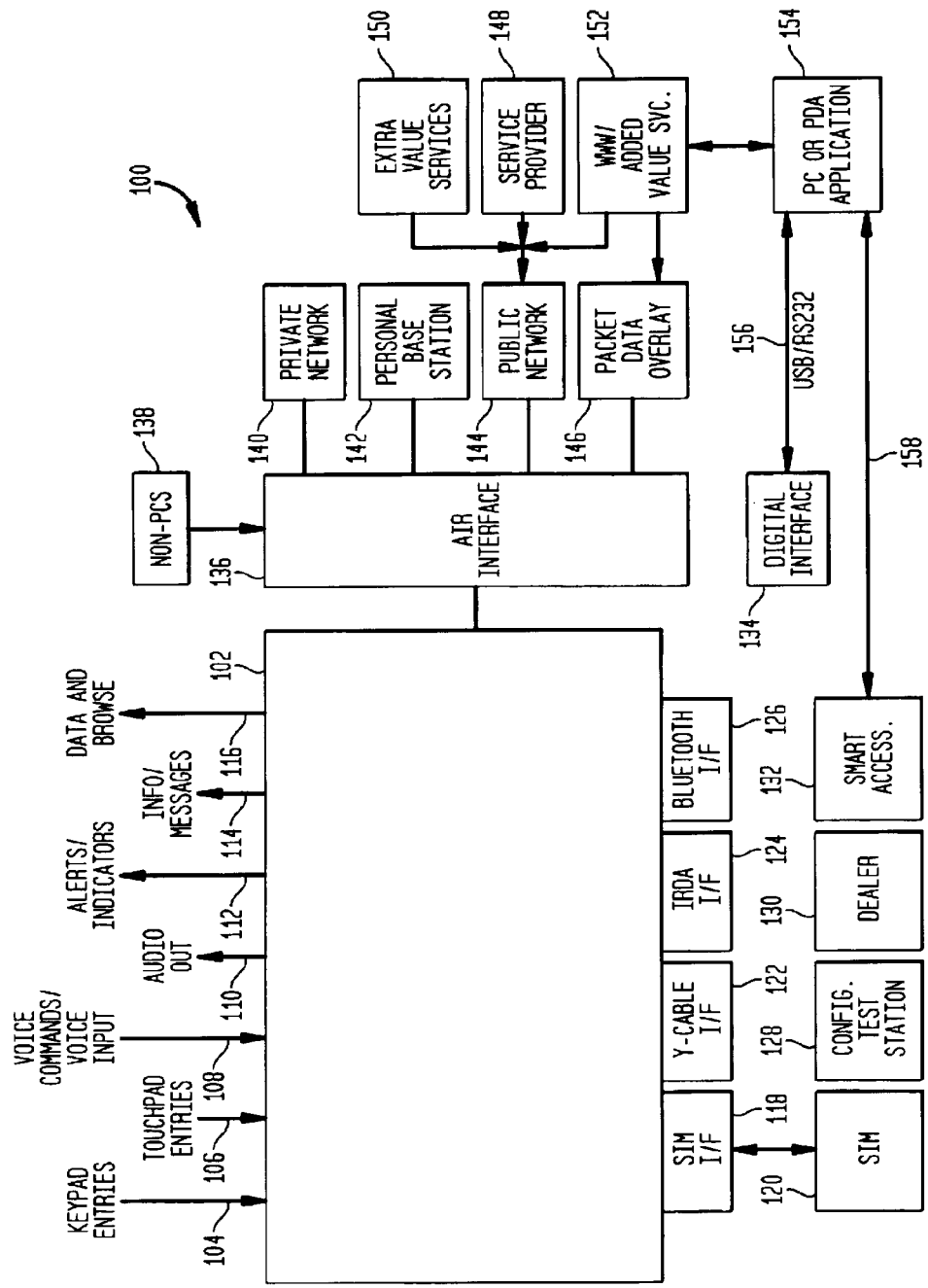
FIG. 1 illustrates a wireless telephony system including a mobile telephone according to the present invention.

FIG. 1 illustrates a wireless telecommunications system 100 according to the present invention. The system 100 includes a wireless telephone 102 adapted to perform a variety of functions in providing communication ability and other services to a user. The wireless telephone 102 includes two segments employed in performing functions, with each segment being designed to perform particular types of functions, with functions assigned to each segment accordingly. The wireless telephone 102 will be described in greater detail in connection with the discussion of FIGS. 2–4 below, illustrating further details of the segments and the functions assigned to each.

The wireless telephone 102 receives user inputs including keypad entry inputs 104, touchpad entry inputs 106, and voice inputs 108, used for commands and or for transmission. The telephone 102 provides an audio output 110 to the user in order to allow the user to hear received transmissions such as voice or other audio, and also provides information and message outputs 114, alerts and indicators 112 and a data and browsing output 116, suitable for use in displaying data, such as Internet data.

The telephone 102 also includes a subscriber identity module (SIM) interface 118 to allow addition of a SIM 120. The telephone 102 also includes a Y-cable interface 122, an infrared device adapter (IRDA) interface 124 and a communications adapter such as a BLUETOOTH® interface 126. The Y-cable interface 122, IRDA interface 124 and BLUETOOTH® interface 126 allow the telephone 102 to communicate with various peripheral devices, such as a configuration/test station 128, dealer station 130, smart accessories 132 and external digital interface 134. Each of the configuration/test station 128, the dealer station 130, the smart accessories 132 and the digital interface 134 may be adapted to operate with either the Y-cable interface 122, the IRDA interface 124 or the BLUETOOTH® interface 126, depending on the particular design choices made for the device in question.

The telephone 102 implements an air interface 136 for providing communication to various wireless services. The term "air interface" is widely known in the art, and is used to describe a communication protocol or set of protocols for wireless communication with base stations or other hardware used by service providers. The air interface may include protocols such as packet data networking, CDMA, TDMA, GSM or the like. Services with which the telephone 102 is used for communication may include non-PCS broadcast 138, a private network 140, a personal base station 142, a public network 144 and a packet data network overlay 146. The public network 144 allows for access to services provided by a service provider 148. An extra value services provider 150 may also be made accessible through the public network 144. Internet services 152 such as world wide web (www) services and added value services may be made available through the packet data network overlay 146 and also through the public network 144. www services are typically routed through the packet data overlay 144 because they involve transmission and reception of data packets, while other value added services may more suitably be routed through the public network 144. Other value added services are made available through a PDA application 154, which communicates with the digital interface 134 using a digital connection 156. The digital connetion 156 may suitably be a universal serial bus (USB) connection or an RS232 connection. The PC or PDA application 154 may also be used to connect with the smart accessories 120 using an analog connection 158, and may also provide a connection to the Internet services 152.

Figure 2:
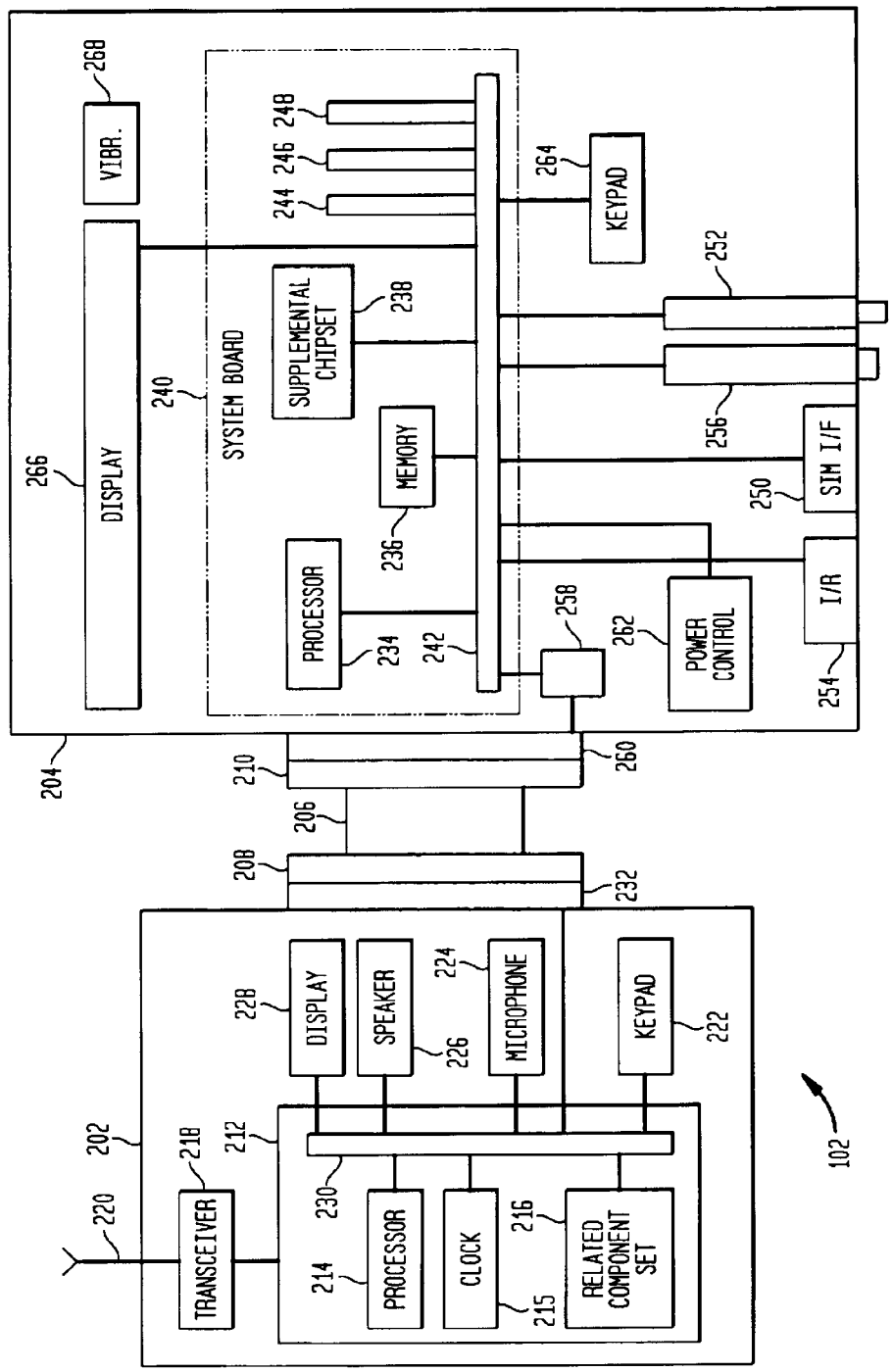
FIG. 2 illustrates additional details of a mobile telephone according to the present invention.

FIG. 2 illustrates additional details of the telephone 102 of FIG. 1. The telephone 102 includes a basic telephone module 202 connected to an enhanced services module 204. The telephone 100 also includes an interface module 206 which provides data transfer between the basic telephone module 202 and the enhanced services module 204. The interface module 206 may suitably comprise a universal serial bus (USB) port, a memory module shared between the basic telephone module 202 and the enhanced services module 204 or a port on a bus managing data and control functions within the basic telephone module 202. The interface module 206 may include a first zero insertion force (ZIF) connector 208 and a second ZIF connector 210 to allow easy connection to the basic telephone module 202 and the enhanced services module 204. It is possible to remove the enhanced services module 204 and connect the enhanced services module 204 to a different basic telephone module 202. Similarly, it is possible to connect the basic telephone module 202 to a different enhanced services module 204. This allows a customer to configure an enhanced services module 204 according to his or her preferences and retain the enhanced services module 204 when he wishes to upgrade or replace the basic telephone module 202. Alternatively, a customer may acquire an improved enhanced services module 204 and connect it to his or her existing basic telephone module 202.

The basic telephone module 202 preferably includes basic components needed for operation. These include a basic mobile chipset 212, including mobile telephone processor 214, clock 215 and related component set 216. The mobile telephone processor 214 is preferably a digital signal processor (DSP), an application specific integrated circuit (ASIC) or similar hardware and the related component set 216 includes memory and other supporting hardware and software needed to process information used by the mobile telephone processor 214. The basic telephone module 202 also includes an RF transceiver 218, antenna 220, keypad 222, microphone 224 and loudspeaker 226. A display 228 is also preferably included. The basic telephone module 202 also includes a communication bus 230 for transferring data between the components of the telephone module 202 and a telephone module connector 232 connected to the bus 230, to provide a connection to the interface module 206.

Communication functions carried out by the basic telephone module 202 operate in real time, that is, under close time tolerances, in order to provide acceptable telephone service. In a presently preferred embodiment, the basic mobile chipset 212 is highly optimized for reduced instruction set computing (RISC) processing and the basic telephone processor 214 preferably employs the real time operating system (RTOS), which is designed to efficiently control operations of processors operating in an interrupt driven environment of the type which characterizes wireless communication processing.

The enhanced services module 204 provides enhanced services to a user. These enhanced services may include features such as speed dialing, distinctive ring features, voice recognition, world wide web access, personal organizer functions or the like. The enhanced services module 204 preferably includes processing hardware designed and constructed according to conventional PC architecture standards. The processing hardware includes a microprocessor 234, associated memory 236 and a supporting chipset 238. The processing hardware is arranged on a system board 240 similar to that found in a handheld PC or PALM™ device, and transfers data between components using a bus 242, which may suitably be a standard PC bus such as a PCI bus. The system board 240 may also include slots such as slots 244–248 for installation of additional optional hardware. Optional hardware may include optional interfaces for communicating with external devices. The system board 240 may also have built in interfaces for communication with external devices. These interfaces may include a subscriber identity module (SIM) interface 250 for accepting an external SIM containing subscriber information, a Y-cable interface 252, an infrared device adapter (IRDA) interface 254 and a BLUETOOTH® adapter 256. The SIM interface 250 allows quick and easy connection of a SIM defining user identity and preferences, and thus allows quick and easy configuration of the telephone 102 for a particular user.

Any or all of the interfaces 250–256 may be designed into the system board or alternatively a user may select optional interface cards which may be connected using the slots 244–248, in order to provide desired interface capability. It is preferred, however, that any design include the SIM interface 250 in order to provide compatibility with a SIM module. The enhanced services module 204 also includes a telephone interface 258 to provide an interface to the basic telephone module 202 through the interface module 206. The telephone interface 258 is connected to a ZIF connector 260.

The enhanced services module 204 also includes a power control system 262 for management of power received from an onboard battery or from an automotive installation. The enhanced services module 222 also includes a keypad 264, display 266 and vibrator 268 in order to receive inputs from a user and to convey messages to the user.

The functions performed by the enhanced services module 204 typically take place under flexible time constraints. For example, a typical function for the enhanced services module 204 is retrieval of a speed dial number. This retrieval takes place at the beginning of a call, in a time frame characterized by human response times. When a user wishes to retrieve a speed dial number, the enhanced services module 204 will have on the order of ½ second to 1 second or more before the user begins to become impatient or even to notice any delay. This high delay tolerance also characterizes most other functions of the enhanced services module 204, in contrast to the low delay tolerance characteristic of the telephony processing functions carried out by the basic telephone module 202. Therefore, the basic telephone module 202 controls scheduling of data transfer between the basic telephone module 202 and the enhanced services module 204. That is, the basic telephone module 202 allows communication between itself and the enhanced services module 204 only when the basic telephone module 202 is ready to receive data, and interrupts other operations being performed by the enhanced services module 204 when the basic telephone module 202 has data to send to the enhanced services module 204. In this way, the enhanced services module 204 is prevented from interfering with the timing required by the basic telephone module 202.

The memory 236 belonging to the enhanced services module 204 may suitably be volatile memory, or a combination of volatile and nonvolatile memory, depending on design choices for the enhanced services module 204. If the enhanced services module 204 is designed to provide relatively limited functions, volatile memory may preferably be used. In this case, the enhanced services module 204 will be primarily controlled by downloaded software such as JAVA™, PEARL™ and other portable functions and will serve primarily as an adjunct to the basic telephone module 202, providing phonebook and other simple functions. If a combination of nonvolatile memory such as ROM, and volatile memory is used, the enhanced services module 204 may maintain an operating system and be adapted to load and run downloaded or stored programs. It is also possible, depending on design choices, to implement the enhanced services module 204 without the display 264 or keypad 262, allowing the enhanced services module 204 to share the keypad 222 and display 228 belonging to the basic telephone module 202.

Figure 3:
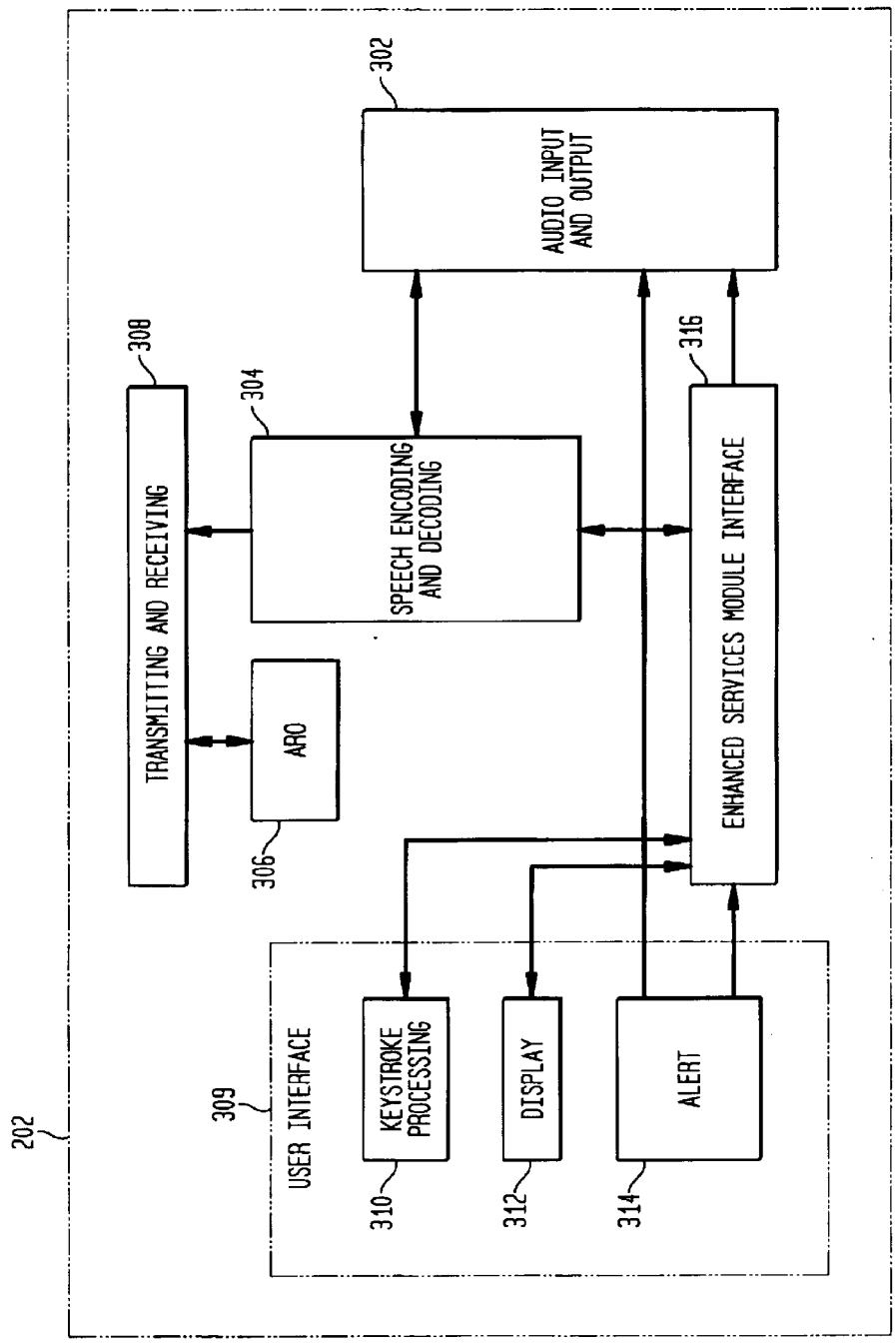
FIG. 3 illustrates functional details of a basic telephone module according to the present invention.

FIG. 3 is a diagram of the basic telephone module 202, illustrating functions performed by the basic telephone module 202 and data transfers performed within the basic telephone module 202 in order to conduct communication between the basic telephone module 202 and a base station (not shown) and between the basic telephone module and the enhanced services module (not shown in this drawing). The basic telephone module 202 performs an audio input and output function 302, comprising receiving audio input through the microphone 224 and performing analog to digital conversion on the audio input, as well as performing digital to analog conversion to produce audio output for transmission through the speaker 226. The basic telephone module 202 also performs a speech encoding and decoding function 304, converting audio inputs into symbols for transmission and converting received symbols into speech to be converted to analog audio output. The basic telephone module 202 also performs authentication and registration operations 306, retrieving an electronic serial number (ESN) upon initial powerup and processing the ESN and other identification information sent to and received from the base station. The basic telephone module also performs transmitting and receiving operations 308, transmitting and receiving speech and data to and from the base station. The basic telephone module 202 also performs user interface functions 309, including a keystroke processing function 310, a display function 312 and an alert function 314 such as identifying an incoming call and producing a ring signal for the speaker 226. The alert function transfers data to the audio input and output function 302 in order to produce the ring signal.

The basic telephone module 202 also includes an enhanced services module interface 316, which provides communication with the enhanced service module 204. The enhanced services module interface function 316 also detects the presence or absence of the enhanced services module 204 in order to provide the ability to disable selected functions in the basic telephone module 202 in order to use the enhanced services module 204 in order to perform the functions. For example, the basic telephone module 202 may be designed to employ the keypad 264 or display 266 of the enhanced services module 204, if the enhanced services module 204 is present. In that case, the basic telephone module 202 disables the keypad 222 and the display 224 in order to remove the processing demands imposed by those devices and enables use of the keypad 264 and 266 of the enhanced services module 204. In such a case, processing of keystrokes is performed by the enhanced services module 204 and the results of the processing are supplied to the basic telephone module 202. Data to be displayed is provided by the basic telephone module 202 to the enhanced services module 204, which then processes the data for display.

The basic telephone module 202 may be set to operate in data or voice mode. If the module 202 is operating in data mode, the audio input and output function 302 may suitably be disabled and data transmission carried on using the transmitting and receiving function 308 and the speech encoding and decoding function 306, with the speech encoding and decoding function 304 using the enhanced services module interface function 316 to deliver data to the enhanced services module 204 for processing. This situation occurs when the telephone 102 is used to achieve a wireless connection to the Internet or to another online service and the enhanced services module 204 is used to perform functions such as web browsing. In such a case, audio input and output is not necessarily carried out. Instead, the user enters data and commands through keypad entries, which are more readily processed by the enhanced services module 204. The data and commands entered by the user are conveyed from the enhanced services module 204 to the basic telephone module 202 for encoding using the encoding and decoding module 304 and transmission to a base station using the transmitting and receiving function 308, and data received by the basic telephone module 202 is conveyed to the enhanced services module 204 for display.

Figure 4:
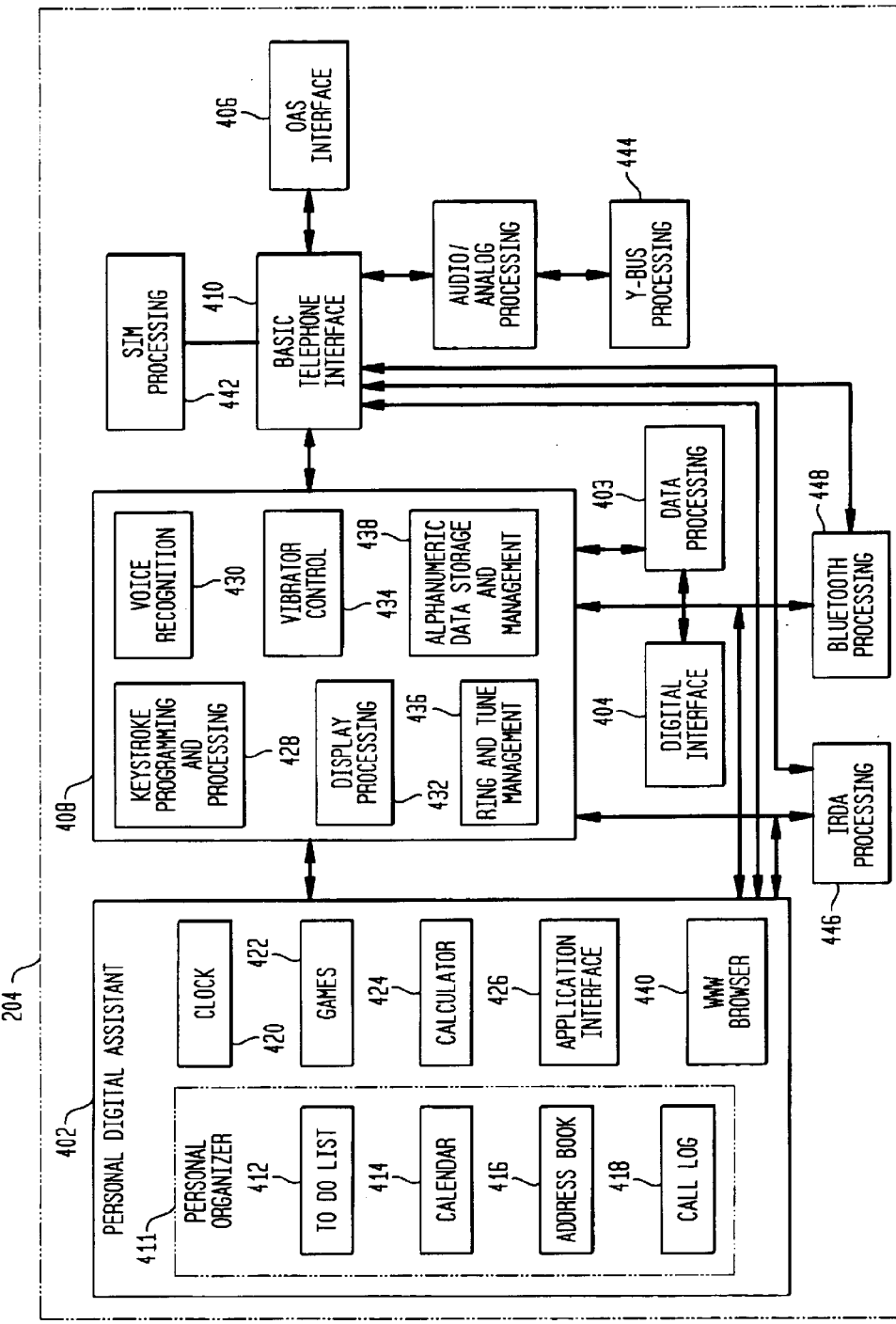
FIG. 4 illustrates functional details of an enhanced services module according to the present invention.

FIG. 4 is a diagram of the enhanced services module 204, illustrating exemplary functions performed by the enhanced services module 204 and data flow between the functions. The enhanced services module 204 includes a personal digital assistant function 402, a data processing function 403, interface functions including a digital interface 404 and an over the air services interface 406, as well as a user interface 408 and a basic telephone interface 410. The basic telephone interface 410 performs data control and exchange between the enhanced services module 204 an the basic telephone module 202. The personal digital assistant function 402 includes a personal organizer function 411 comprising a to do list 412, calendar 414, address book 416 and call log 418, as well as a clock 420, games 422, calculator 424, application interface 426 and worldwide web browser 440. The user interface 408 includes keystroke programming and processing 428, voice recognition 430, display processing 432, vibrator 434, ring and tune management 436 and alphanumeric data storage and management 438. The user interface 408 communicates with the basic telephone interface 410 in order to provide user inputs to the basic telephone module 202 and to receive user data from the basic telephone module 202.

For example, if a user wishes to use the keypad 264 to make a call, the keystrokes entered on the keypad 264 are processed by the keystroke programming and processing function 428 and transferred to the basic telephone module by the basic telephone interface 410. Alternatively, a ring alert may be received from the basic telephone module 202. The ring alert is processed by the basic telephone interface 410 and conveyed to the ring and tune management function 436 for processing. Under the control of the ring and tune management function 436, the enhanced services module 204 may then play an alert chosen by the user. In this way, the basic telephone module 202 is able to use minimal processing in order to generate a simple alert signal. This alert signal can then be conveyed to the enhanced services module 204, which is able to use resources belonging to the enhanced services module 204 in order to generate a more elaborate alert tone, while placing only a minimal processing load on the basic telephone module 202.

It is also possible to use the enhanced services module 204 to provide keypad enhancements even if a choice is made to design the enhanced services module 204 without a keypad such as the keypad 264, but simply to allow keystroke entries made using the keypad 222 of the basic telephone module 202 to be used by the enhanced services module 204. In such a case, keystroke definitions would be associated with keys of the keypad 222 and stored in the enhanced services module 204. When a keystroke was made, basic keystroke information would be transferred to the enhanced services module 204, where the stored definition would be retrieved and either used within the enhanced services module 204 or transferred to the telephone module 202. In this way, keystroke programming can be accomplished using processing resources and memory belonging to the enhanced services module 204, without a necessity for a separate keypad in the enhanced services module 204.

The enhanced services module 204 can perform a number of functions, such as calendar 414, address book 416 and the like, without involving the basic telephone module 202 at all. A combination of the enhanced services module 204 and the basic telephone module 202 can thus provide these services without any need for supporting processing resources to be provided in the basic telephone module 202. If features belonging to the enhanced services module 204 are integrated with those of the basic telephone module 202, for example, if a user retrieves a telephone number from an address book feature of the enhanced services module 204, and then chooses to dial that number, the number can be sent to the basic telephone module 202 for dialing, with the processing burdens of storage and retrieval being confined to the enhanced services module 204, and only the task of receiving and dialing the digits being performed by the basic telephone module 202.

Other functions such as the keystroke programming and processing function 428 may be accomplished independently or by communicating with the basic telephone module 202 depending on the circumstances. Still other functions, such as the www browser function 427, depend on communication with the basic telephone module 202.

The enhanced services module 204 provides interface capability for external devices, and therefore provides functions for SIM processing 442, Y-bus processing 444, IRDA processing 446 and BLUETOOTH® processing 448. Data is transferred between the SIM processing function and the basic telephone interface 410. For the Y-bus processing function 444, the IRDA processing function 446 and the BLUETOOTH® processing function 448, data is transferred between the PDA function 402, user interface function 408 and basic telephone interface 410, as needed. For example, if the enhanced services module 204 is used to print a web page using a printer having an infrared interface, the IRDA processing function 446 receives data from the www browser function 427 via the PDA function 402 and transfers the data to the printer. The IRDA processing function 446 also receives data from the user interface 408 in order to receive commands needed to select printing options. Similarly, if it is desired to send a fax using a scanned image received from a portable scanner having an infrared interface, the IRDA processing function 446 will be used to receive data from the scanner. The data will then be transferred to e basic telephone module 202 for transmission, using the basic telephone interface function 410.

Figure 5:
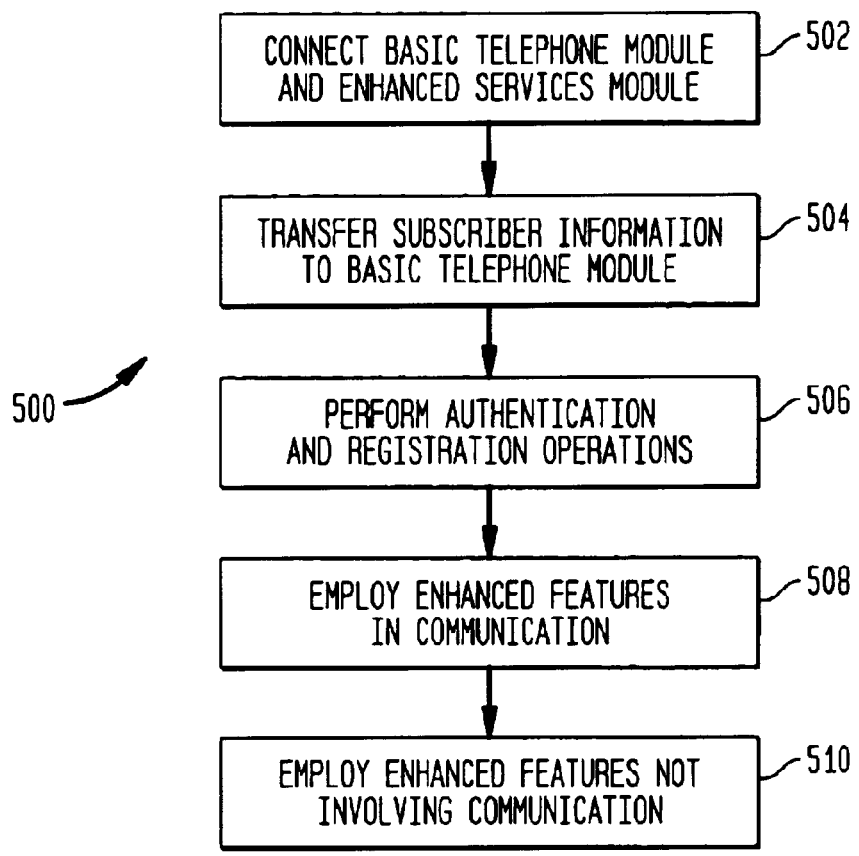
FIG. 5 illustrates a process for wireless telephony according to the present invention.

FIG. 5 illustrates the steps of a process 500 for wireless communication according to the present invention. At step 502, a connection is made between a basic telephone module and an enhanced services module. The basic telephone module may suitably be similar to the basic telephone module 202 of FIG. 2 and the enhanced services module may suitably be similar to the enhanced services module 204 of FIG. 2. At step 504, subscriber information is transferred from the enhanced services module to the basic telephone module. At step 506, the basic telephone module performs authentication and registration operations to establish communication with a base station. At step 508, enhanced features provided by the enhanced services module are used in communication. Features employed may include enhanced ringing, enhanced display, speed dialing from an address book or telephone book, voice recognition allowing spoken commands to be translated into dialing instructions, web browsing, call logging, or any of the features described above, or other enhanced features which the enhanced services module may be designed to offer. In carrying out communication, functions required for communication are carried out by the basic telephone module while enhanced functions operating under looser time constraints are carried out by the enhanced services module. The basic telephone module passes data and instructions to the enhanced services module as needed, and the enhanced services module passes processed data to the basic telephone module when needed by the basic telephone module. At step 510, the enhanced features not involving communication are carried out using the enhanced services module. These may include games, address book functions, to do list or calendar functions or the like. Steps 508 and 510 are not carried out in sequence, but instead each of steps 508 and 510 is carried out as invoked by a user in response to commands entered by the user.

Figure 6:
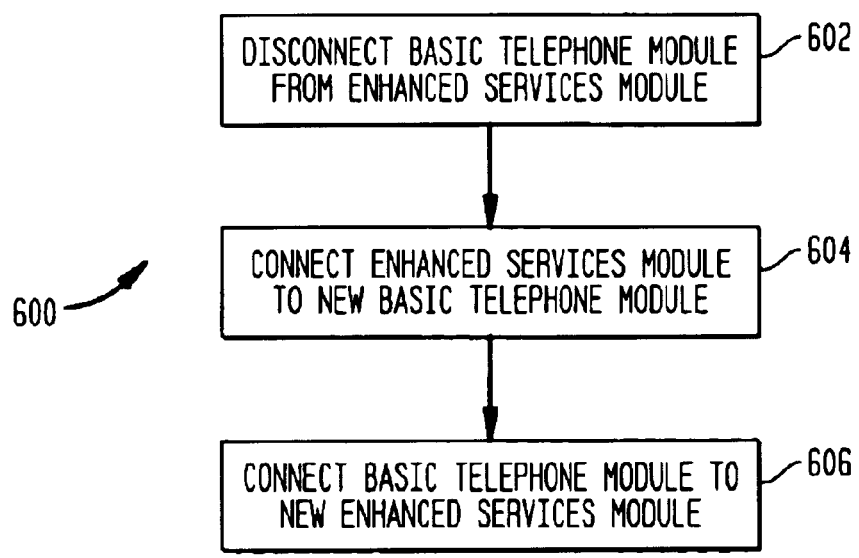
FIG. 6 illustrates a process for upgrading a wireless telephone according to the present invention.

FIG. 6 illustrates a process of upgrading a wireless telephone 600 according to the present invention. At step 602, a basic telephone module is disconnected from an enhanced services module. The basic telephone module may suitably be similar to the basic telephone module 202 of FIG. 2, while the enhanced services module may suitably be similar to the enhanced services module 204 of FIG. 2. At step 604, the enhanced services module is connected to a new or upgraded basic telephone module to create an upgraded wireless telephone. At an alternative step 606, the basic telephone module is connected to a new or upgraded enhanced services module to create an upgraded wireless telephone.

The process 600 allows a user to obtain the benefits of new or upgraded equipment while retaining features unique to the user, which may have been programmed by the user at a cost of significant time and effort. For example, connecting an existing enhanced services module to a new or upgraded basic telephone module permits the user to obtain advantages which may be provided by an improved basic telephone module, such as greater range for use in connecting to base stations in fringe areas, or lower power consumption. Retaining the enhanced services module allows the user to retain features such as a speed dial list or calling log, which may have been developed over a period of months or years, without any need to reprogram the speed dial list or calling log into a new telephone.

While the present invention is disclosed in the context of a presently preferred embodiment, it will be recognized that a wide variety of implementations may be employed by persons of ordinary skill in the art consistent with the above discussion and the claims which follow below.

I claim:

1. A wireless telephone, comprising:
    a basic telephone module for establishing a connection to a base station and processing voice and data for communication with the base station, the basic telephone module being operative to perform a group of time critical functions for communication with the base station and a group of non time critical functions; and
    an enhanced services module adapted to connect with the basic telephone module in order to perform the group of non time critical functions upon detection by the basic telephone module of the connection of the enhanced services module with the basic telephone module, the enhanced services module receiving data from the basic telephone module, processing the data and passing processed data to the basic telephone module during intervals when the basic telephone module has sufficient idle processing capacity available to receive the data,
    the basic telephone module detecting the connection of the enhanced services module, in response to detecting the connection of the connected enhanced services module, the basic telephone module disabling the group of non time critical functions being performed by the basic telephone module, and enabling the group of non time critical functions to be performed by the enhanced services module.

2. The telephone of claim 1 further comprising an interface module for transferring data between the basic telephone module and the enhanced services module.

3. The telephone of claim 2 wherein the enhanced services module comprises:
    a processor,
    a memory;
    a bus for transferring data between the processor and the memory, the bus also transferring data to and from the basic telephone module though the interface module.

4. The telephone of claim 3 wherein the basic telephone module, the enhanced services module and the interface module each include connectors to allow easy connection and disconnection of the basic telephone module to and from the enhanced services module.

5. The telephone of claim 4 wherein the connectors are zero insertion force connectors.

6. The telephone of claim 4 wherein the interface module comprises a universal serial bus connection.

7. The telephone of claim 5 further comprising a connection module having a memory module accessible to both the basic telephone module and the enhanced services module.

8. The telephone of claim 5 wherein the enhanced services module includes external device interfaces for connecting the telephone to external devices and wherein the bus also transfers data between the processor and the external device interfaces.

9. The telephone of claim 8 wherein the external device interfaces include a subscriber identity module interface.

10. The telephone of claim 9, wherein the external device interfaces include a Y-cable interface, an infrared device adapter interface and a BLUETOOTH® interface.

11. The telephone of claim 10 wherein the enhanced services module performs a worldwide web browser function to allow user communication over an Internet connection.

12. The telephone of claim 11 wherein the basic telephone module includes user interface components and wherein the enhanced services module provides enhancements to the user interface components of the basic telephone module by receiving basic data signals from the user interface components, retrieving enhanced data signals in response to the basic data signals and supplying the enhanced data signals to the basic telephone module.

13. The telephone of claim 12 wherein the user interface components of the basic telephone module include a keypad and wherein the enhanced services module receives keystroke information from the basic telephone module, retrieves enhanced keystroke data in response to the keystroke information and supplies the enhanced keystroke data to the basic telephone module.

14. The telephone of claim 13 wherein the user interface components of the basic telephone module include a display and wherein the enhanced services module receives display data from the basic telephone module, adds display enhancements to the display data and transfers the display data and display enhancements to the basic telephone module for display.

15. The telephone of claim 14 wherein the enhanced services module produces enhanced services module display data and transfers the enhanced services module display data to the basic telephone module in order to display the enhanced services module display data.

16. The telephone of claim 15 wherein the enhanced services module display data includes personal organizer information retrieved from the enhanced services module and processed for display.

17. A method of wireless communication, comprising:
   connecting a basic telephone module to an enhanced services module;
   receiving inputs from a user and transferring data between the basic telephone module and the enhanced services module;
   storing inputs in order to perform functions selected by the user in the absence of a communication connection with a base station;
   transferring subscriber information from the enhanced services module connected to the basic telephone module during intervals when the basic telephone module has sufficient idle processing capacity available to receive the subscriber information;
   establishing a connection with a base station;
   conducting communication functions with the base station using the basic telephone module to perform time critical functions and non time critical functions;
   detecting the connection of the enhanced services module; and
   transferring the performance of said non time critical functions to the enhanced services module, in response to detecting the connection of the enhanced services module to the basic telephone module.

18. A method of upgrading a wireless telephone comprising the steps of:
   removing an enhanced services module from a basic telephone module;
   connecting the enhanced services module to a new basic telephone module, the new basic telephone module openable for processing a group of time critical functions and a group of non time critical functions;
   detecting the connection of the enhanced services module; and
   transferring the processing of the group of non time critical functions to the enhanced services module, in response to detecting the connection of the enhanced services module to the basic telephone module.

19. A method of upgrading a wireless telephone comprising the steps of:
   removing an enhanced services module from a basic telephone module;
   connecting the basic telephone module to a new enhanced services module; the basic telephone module operable for processing a group of non time critical functions;
   detecting the connection of the new enhanced services module; and
   transferring the processing of the group of non time critical functions to the new enhanced services module, in response to detecting the connection of the enhanced services module to the basic telephone module.

20. A wireless telephone of claim 1 wherein the enhanced services module further comprises a keyboard.

21. A wireless telephone of claim 1 wherein the enhanced services module further comprises a display.

22. A wireless telephone comprising:
   an interface module;
   an enhanced services module removeably attached to the interface module; and
   a basic telephone module removeably attached to the interface module, the basic telephone module controls scheduling of data transfer between the basic telephone module and the enhanced services module by indicating when the basic telephone module is ready to receive data or interrupting operations being performed by the enhanced services module when the basic telephone module has data to send to the enhanced services module, the basic telephone module detecting the connection of the enhanced services module to the interface module, in response to detecting the connection of the enhanced services module connection, the basic telephone module disabling a group of non time critical functions being performed by the basic telephone module, and enabling the group of non time critical functions to be performed by the enhanced services module.

23. A wireless telephone, comprising:
   a basic telephone module for establishing a connection to a base station and processing voice and data for communication with the base station, the basic telephone module having a first processor, a plurality of basic components needed for operation, and a first internal bus to communicate therebetween, the basic telephone module being operative to perform time critical and non time critical functions for communication with the base station; and
   an enhanced services module adapted to connect with the basic telephone module in order to perform non time critical functions, the enhanced services module having a second processor, at least one optional hardware component and a second internal bus to communicate therebetween, the enhanced services module receiving data from the basic telephone module, processing the data by communicating between the second processor and the at least one optional hardware component and passing processed data to the basic telephone module during intervals when the basic telephone data has sufficient idle processing capacity available to receive the data, the basic telephone module detecting the connection of the enhanced services module to the basic telephone module, in response to detecting the connection of the enhanced services module, the basic telephone module disabling a non time critical function being performed by the basic telephone module, and enabling the non time critical functions to be performed by the enhanced services module.

* * * * *